July 28, 1953  J. HANSON  2,646,767
VALVE POSITION INDICATOR
Filed April 30, 1951

John Hanson
INVENTOR.

BY *Clarence A. O'Brien and Harvey B. Jacobson*
Attorneys

Patented July 28, 1953

2,646,767

UNITED STATES PATENT OFFICE 2,646,767

VALVE POSITION INDICATOR

John Hanson, Three Hills, Alberta, Canada

Application April 30, 1951, Serial No. 223,795

6 Claims. (Cl. 116—125)

This invention relates to new and useful improvements in valve position indicating means, and pertains particularly to such indicating means that may be used on valves of the type including a threaded valve stem extending through a wheel operated nut rotatably mounted on the valve housing for adjusting the position of the valve.

In the past, difficulty has been experienced in ascertaining the position of a valve that is adjusted in position by a wheel-operated nut rotatably mounted on the valve housing through which the threaded valve stem extends for the reason that while the amount of extension of the valve stem above the wheel or from the valve housing affords an accurate measure of the position of the valve, such extension could not be readily and accurately measured because of the rotary mounting of the wheel. Obviously, a valve indicating means could be provided in this environment which would include structure secured to the valve housing and which would extend upwardly therefrom outside of the periphery of the wheel to terminate in a gauge bar having indicia thereon and disposed in parallel relation to the valve stem above the wheel, so that the relative position of the free end of the valve stem to the indicia on the gauge bar would afford an indication of the valve position. However, such a construction is subject to several serious objections, namely, the structure would be in the way and interfere with the manipulation of the wheel, accurate readings would be difficult to obtain by merely sighting the gauge bar over the end of the valve stem, and the gauge bar would be readily susceptible to displacement from its proper position relative to the valve stem to make the taking of readings not only difficult but even impossible.

Accordingly, the primary object of this invention is to provide a construction which will not be subject to the aforementioned difficulties, and which, specifically, will not interfere in the slightest degree with the manipulation of the valve control wheel, and which will afford accurate readings that may be easily taken, and which will not be subject to such disarrangement that would render the taking of accurate readings impossible.

Further objects of this invention are to provide a device of this character which is simple, efficient and durable for the purposes intended and which may be readily attached to conventional valves without substantial modification of the latter.

A meritorius feature of the present invention resides in the means for mounting the gauge bar to rotate with the wheel about the axis of the valve stem with the bar being alternatively supported on the valve housing itself or directly on the wheel.

Another important feature of the present invention resides in the indicator arm and the dual functions served thereby, that is, the primary function of use in taking readings on the gauge bar, and in holding the gauge bar and the valve stem in the proper relative positions.

Other features of the invention of merit reside in the collar constructions provided for rotatably mounting the indicator arm and the gauge bar.

These, together with various ancillary features and objects of the invention which will later become apparent as the following description proceeds, are attained by the present invention, a preferred embodiment of which has been illustrated by way of example only in the accompanying drawings, wherein.

Reference is now made more specifically to the accompanying drawings, wherein like numerals designate similar parts throughout the various views, and in which a conventional gate valve is designated generally at 10.

Figure 1:
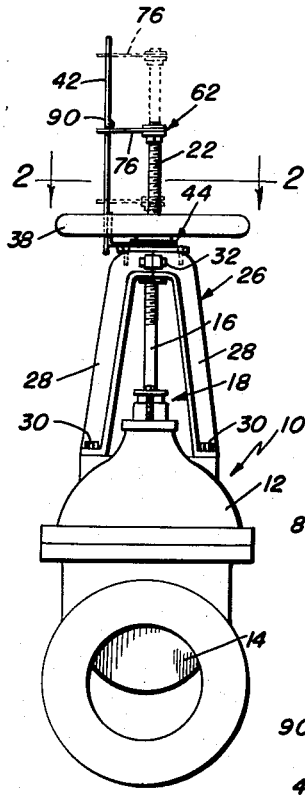
Figure 1 is a side elevational view of the present invention showing the same attached to a conventional valve, with an alternative position of the same as well as certain hidden details of construction being shown in dotted outline.
Figure 3:
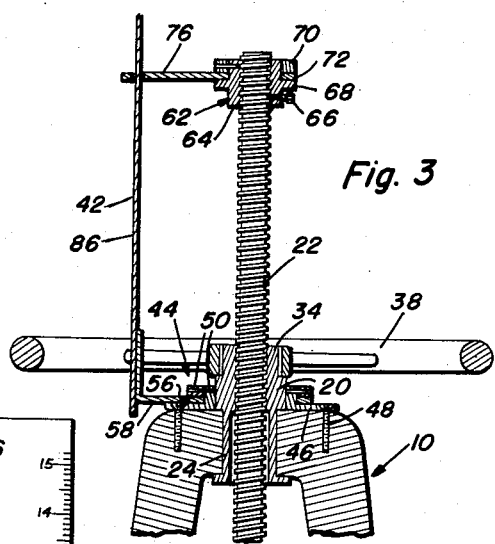
Figure 3 is an enlarged central vertical sectional detail view of the manner in which the valve position indicating means is mounted on the valve.
Figure 2:
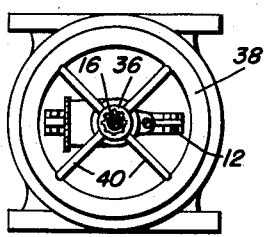
Figure 2 is a horizontal sectional view taken upon the plane of the section line 2—2 of Figure 1.
Figure 4:
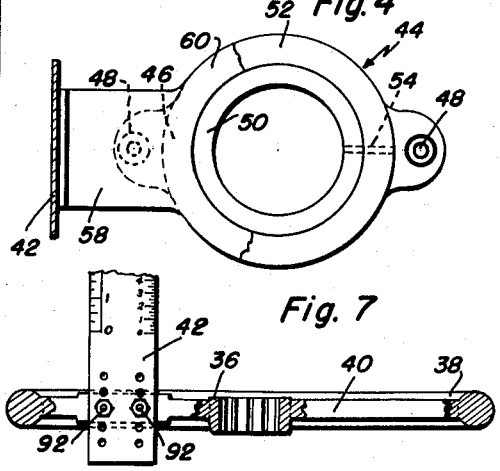
Figure 4 is an enlarged top plan view, partially in section, of the means for rotatably mounting the gauge bar on the valve, portions of the same being broken away and hidden details being indicated in dotted outline to better illustrate the construction of the same.

As best shown in Figures 1 and 3, the conventional valve 10 includes a valve housing 12 in which is slidably mounted the closure member or valve 14. As in conventional valves of this type, a valve stem 16 is secured to the valve 14 and projects slidably through suitable packing means 18 carried by the housing 12 to extend above the valve housing 12.

The valve stem 16 is moved to control the valve 14 by means of a nut 20 threaded on the threaded upper portion 22 of the valve stem 16, the lower portion of the nut being integrally formed as a flanged bushing 24 journaled through and restrained against vertical movement by the sectional yoke construction 26. The yoke construction 26 includes a pair of separable sections 28, the lower ends of which are removably secured to the valve housing 12 by fasteners 30, and the upper ends of which are detachably secured together by fasteners 32 to receive the bushing portion 24 of the nut 20 therebetween.

The upper portion of the nut 20 is formed as a polygonal projection 34 which extends into the complementary shaped opening of the hub 36 of a spoked valve control wheel 38 including radially extending spokes 40, the arrangement being such that the nut 20 may be rotated by turning the wheel 38 to raise and lower the valve stem 16 for moving the valve 14 towards opening and closing positions.

The construction thus far described is entirely conventional in character, and has been illustrated and described solely to set forth a suitable environment for the use of the subject matter of this invention therewith. It will, of course, be understood that various valve constructions of this general type will be equally as well suited for use with the invention as the particular valve construction illustrated and described herein.

Figure 6:
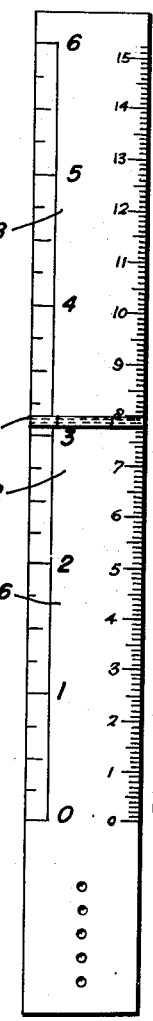
Figure 6 is an elevational view of the gauge bar with hidden details therein being indicated in dotted outline.

The form of the invention illustrated in Figures 1-6, inclusive, comprises a gauge bar 42 that extends in parallel relation to the valve stem 16 and which is provided with suitable indicia thereon as illustrated particularly in Figure 6. Means is provided for supporting the gauge bar 42 against endwise movement relative to the valve housing 12 and for rotation about the axis of the valve stem 16, such means comprising a collar construction designated generally at 44. The collar construction 44 comprises an annular plate 46 that is detachably secured to the sections 28 of the yoke construction 26 by threaded fasteners 48, such annular plate 46 having formed integral therewith an upstanding annular flange 50 that surrounds the bushing 24. An annular member 52 surrounds the flange 50 in spaced relation to the plate 46 and is detachably secured to the flange 50 by means of a radially extending removable pin 54 extending through the member 52 and the flange 50, as clearly shown in Figure 4. The relationship of the member 52 to the flange 50 and the plate 46 is such that a discerptible collar construction 44 is defined having a peripheral annular groove 56 therein (see Figure 3). An L-shaped bracket is suitably secured to the gauge bar 42 adjacent the lower end of the latter, such bracket including a laterally projecting arm 58, which arm 58 at its end remote from the gauge bar 42 terminates in a ring 60 that is rotatably seated in the annular groove 56, that is, the ring 60 rotatably embraces the flange 50 intermediate the plate 46 and the member 52. It will be appreciated that the ring 60 may be readily removed from the collar construction 44 by virtue of the pin 54 detachably connecting the member 52 to the flange 50, and that the entire collar construction 44 may be readily removed from the valve by the fasteners 48.

As thus far described, it will be seen that the gauge bar 42 is supported in such a manner by the collar construction 44 that the same is denied endwise movement relative to the valve housing 12, and that the same is free to rotate about the axis of the valve stem 16. As clearly shown in Figures 1 and 3, the gauge bar 42 extends upwardly through the wheel 38 between the spokes 40 thereof and is disposed in closely spaced parallel relation to the portion of the valve stem 16 extending above the yoke construction 26. Means is provided for retaining the upper end portion of the gauge bar 42 in properly spaced relationship to the valve stem 16 and in order to afford an easy manner to read the relative position of the valve stem relative to the longitudinal dimension of the gauge bar. Such means comprise a collar construction designated generally at 62 which includes an internally threaded sleeve 64 threaded upon the valve stem 16, and secured to the valve stem in adjusted position relative to the longitudinal dimension of the valve stem by means of a suitable set screw 66 that extends through the sleeve 64, as best shown in Figure 3. The sleeve 64 is provided with an integral, radially extending flange 68 and a removable annular member 70 that embraces the sleeve 64 in spaced relation to the flange 68, so that the collar construction 62 defines an annular peripheral groove 72. As in the collar construction 44, the member 70 is detachably secured to the sleeve 64 by means of a radially extending removable pin 74 that extends through suitable aligned apertures in the member 70 and the sleeve 64, as will be appreciated upon reference to the drawings. An indicator arm 76 is provided, which arm 76 at one end is provided with an opening 78 to define a ring-shaped portion of the same designated at 80 that is rotatably seated in the annular groove 72 in the collar construction 62. The end of the arm 76 remote from the ring-shaped portion 80 of the same is laterally enlarged, as at 82, and is provided with an aperture 84 therein through which the gauge bar 42 slidably extends.

As thus far described, the operation of the form of the invention shown in Figures 1-6, inclusive, will be readily understood. During the adjustment of the valve 14 by turning the wheel 38, the collar construction 62 will move up and down with the valve stem 16 to exactly the same extent that the valve 14 is moved. Since the gauge bar 42 is secured against vertical movement relative to the valve housing 12 by the collar construction 44, it will be seen that during the vertical adjustment of the valve 14 the indicator arm 76 carried by the collar construction 62 will move vertically relative to the gauge bar 42 to an extent dependent upon the relative movement of the valve 14 to the valve housing 12. Accordingly, the relative position of the valve 14 with respect to the gauge bar 42 may be readily ascertained by observing the value indicated by the indicia on the gauge bar 42 at the intersection of the indicator arm 76 and the arm 76 is disposed at a position below the hinge gauge bar 42. Preferably, the collar construction 62 is so positioned on the valve stem 16 that the indicator arm 76 will be disposed at the zero indication on the gauge bar 46 when the valve 14 is in the fully closed position, so that the indicia on the gauge bar 42 will read the extent that the valve 14 has been opened, as will be readily understood. In order to prevent the gauge bar 42 extending an unnecessary distance above the indicator arm 76, the gauge bar 42 is, in the preferred construction, formed in two sections 86 and 88, which sections 86 and 88 are hingedly connected together as at 90. The arrangement is such that when the indicator 90, the upper section 88 of the gauge bar 42 may be folded over so as to lessen the over-all vertical extent of the gauge bar 42. However, it will be readily appreciated that upon the movement of the indicator arm 76 upwardly relative to the gauge bar 42 past the hinge 90, the indicator arm 76 will serve to erect the gauge bar 42 automatically so that readings from the indicia on the upper section 88 of the gauge bar 42 may be obtained.

Figure 7:
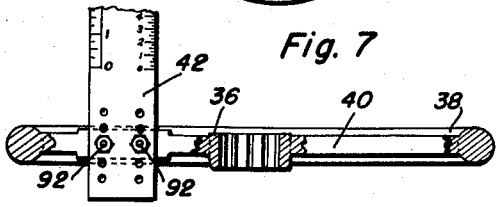
Figure 7 is a fragmentary sectional view of a slightly modified form of the invention, in which the gauge bar is attached to the wheel.
Figure 5:
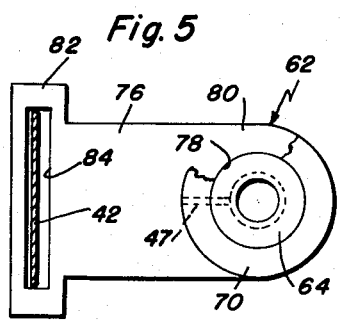
Figure 5 is another enlarged top plan view, partially in section, of the means for rotatably mounting the indicator arm on the valve stem and showing the relation of the gauge bar to the indicator arm, portions of the construction being broken away and hidden details shown in dotted outline.

In the modified form of the invention shown in Figure 7, the construction of the invention is considerably simplified, inasmuch as the collar construction 44 is dispensed with and the lower end of the guide bar 42 is secured directly to one of the spokes 40 of the wheel 38 by means of fasteners 92, so that the guide bar 42 will rotate with the spoke 40 about the valve stem 16 as an axis. In other words, this construction differs from that shown in Figures 1–6, inclusive, in that the guide bar 42 rotates directly with the wheel 38, whereas, in the form of the construction shown in Figures 1–6, inclusive, the guide bar 42 is rotated by engagement thereof by one of the spokes 40.

Since, from the foregoing, the construction and advantage of this valve position indicator are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. In a valve construction of the type including a threaded valve stem extending through a nut rotatably mounted on the valve housing for adjusting the position of the valve, valve position indicating means comprising an elongated gauge bar extending in parallel relation to the valve stem and having indicia thereon, a laterally extending indicator arm mounted for rotation on the valve stem about the axis of the valve stem, said arm having an aperture therethrough slidably receiving the gauge bar therethrough, and means for mounting the gauge bar against endwise movement relative to the valve housing and for rotation about the axis of the valve stem.

2. In a valve construction of the type including a threaded valve stem extending through a nut rotatably mounted on the valve housing for adjusting the position of the valve and a spoked wheel operatively connected to the nut for turning the same, valve position indicating means comprising an elongated gauge bar extending in parallel relation to the valve stem and having indicia thereon, a laterally extending indicator arm mounted for rotation on the valve stem about the axis of the latter, said arm having an aperture therethrough slidably receiving the gauge bar therethrough, said gauge bar extending through the spoked wheel, and means carried by the valve housing on the side of the wheel opposite the indicator arm supporting the gauge bar for rotation about the axis of the valve stem.

3. In a valve construction of the type including a threaded valve stem extending through a nut rotatably mounted on the valve housing for adjusting the position of the valve and a spoked wheel operatively connected to the nut for turning the same, valve position indicating means comprising an elongated gauge bar extending in parallel relation to the valve stem and having indicia thereon, a collar secured to the valve stem and having an annular peripheral groove therein, an indicator arm including inner and outer portions, the inner portion of the arm being ring-shaped and rotatably seated in the groove in the collar, the outer portion of the indicator arm extending radially from the valve stem and having an aperture therethrough slidably receiving the gauge bar therethrough, said gauge bar extending through the spoked wheel, means carried by the valve housing on the side of the wheel opposite the indicator arm for supporting the gauge bar for rotation about the axis of the valve stem comprising a further collar having a peripheral annular groove therein that is concentric with the valve stem, a laterally extending arm on the gauge bar that terminates in a ring rotatably seated in the groove in said further collar.

4. In a valve construction of the type including a threaded valve stem extending through a nut rotatably mounted on the valve housing for adjusting the position of the valve and a wheel secured to the nut for rotating the latter, valve position indicating means comprising an elongated gauge bar extending in parallel rotation to the valve stem and attached to the wheel, said gauge bar having indicia thereon, a laterally extending indicator arm mounted for rotation on the valve stem about the axis of the latter, said arm having an aperture therethrough slidably receiving the gauge bar therethrough.

5. A valve position indicator attachment for use with valves of the type including a threaded valve stem extending through a nut rotatably mounted on the valve housing for adjusting the position of the valve, said indicator comprising an indicator arm, means for mounting the indicator arm on the valve stem for rotation about the axis of the valve stem with the arm extending radially from the valve stem, said arm having an aperture therethrough, an elongated gauge bar slidably extending through the aperture and having indicia thereon, said gauge bar being adapted to extend in parallel relation to the valve stem, and means for supporting the gauge bar against endwise movement relative to the valve housing and for rotation about the axis of the valve stem.

6. A valve position indicator for use with valves of the type including a threaded valve stem extending through a nut rotatably mounted on the valve housing for adjusting the position of the valve, said indicator comprising a gauge bar extending parallel to the valve stem, and means carried at one end of the gauge bar for mounting the same against endwise movement relative to the valve housing and also for rotation about the axis of the valve stem, an indicator arm slidably mounted on said gauge bar and means carried by said indicator arm for mounting the same for rotation about the axis of the valve stem whereby the gauge bar and indicating arm will rotate in unison.

JOHN HANSON.

References Cited in the file of this patent

UNITED STATES PATENTS

| Number | Name | Date |
|---|---|---|
| 933,786 | Richmond | Sept. 14, 1909 |
| 1,907,819 | Hutchings | May 9, 1933 |

FOREIGN PATENTS

| Number | Country | Date |
|---|---|---|
| 20,398 | Great Britain | of 1893 |